United States Patent
Porcher et al.

(10) Patent No.: US 11,050,054 B2
(45) Date of Patent: Jun. 29, 2021

(54) ELECTRODE FOR LITHIUM-ION BATTERY COMPRISING A BINDER FORMED FROM A BLEND OF TWO POLYMERS, THE FIRST POLYMER BEING A FIRST POLYACRYLATE OR ONE OF ITS DERIVATIVES, THE SECOND POLYMER BEING A SECOND POLYACRYLATE OR A CARBOXYMETHYL CELLULOSE OR ONE OF THEIR DERIVATIVES, INK FOR PRODUCING SUCH AN ELECTRODE

(71) Applicants: COMMISSARIAT À L'ENERGIE ATOMIQUE ET AUX ENERGIES ALTERNATIVES, Paris (FR); UMICORE, Brussels (BE)

(72) Inventors: Willy Porcher, Grenoble (FR); Frédéric Barbier, Saint Martin d'Heres (FR); Sophie Chazelle, Vourey (FR); Nicolas Mariage, Voiron (FR); Léo Merchat, Grenoble (FR)

(73) Assignees: COMMISSARIAT À L'ÉNERGIE ATOMIQUE ET AUX ÉNERGIES ALTERNATIVES, Paris (FR); UMICORE, Brussels (BE)

( * ) Notice: Subject to any disclaimer, the term of this patent is extended or adjusted under 35 U.S.C. 154(b) by 277 days.

(21) Appl. No.: 16/083,828

(22) PCT Filed: Mar. 7, 2017

(86) PCT No.: PCT/FR2017/050507
§ 371 (c)(1),
(2) Date: Sep. 10, 2018

(87) PCT Pub. No.: WO2017/153678
PCT Pub. Date: Sep. 14, 2017

(65) Prior Publication Data
US 2020/0343542 A1   Oct. 29, 2020

(30) Foreign Application Priority Data

Mar. 8, 2016 (FR) .................................. 1651917

(51) Int. Cl.
*H01M 4/38* (2006.01)
*H01M 4/62* (2006.01)
(Continued)

(52) U.S. Cl.
CPC .......... *H01M 4/386* (2013.01); *C09D 11/037* (2013.01); *C09D 11/107* (2013.01); *C09D 11/14* (2013.01);
(Continued)

(58) Field of Classification Search
None
See application file for complete search history.

(56) References Cited

U.S. PATENT DOCUMENTS 5,556,721 A * 9/1996 Sasaki ................. H01M 4/0461
205/59
2007/0202403 A1* 8/2007 Oh ....................... H01M 4/133
429/217
(Continued)

FOREIGN PATENT DOCUMENTS

JP   2009252348 A   10/2009
JP   2015198038 A   11/2015
(Continued)

OTHER PUBLICATIONS

English language machine translation of Young et al. (KR 2014-0117313 A), accessed online from Espacenet, PDF pp. 1-16. (Year: 2014).*

(Continued)

*Primary Examiner* — Katie L. Hammer
(74) *Attorney, Agent, or Firm* — Pearne & Gordon LLP

(57) ABSTRACT

Electrode for a lithium storage battery, or a lithium battery, including: an active electrode material, made from silicon, a (Continued)

conductive agent, a binder comprising a mixture of two polymers: the first polymer having a first molecular weight, the first polymer being a first polyacrylate or one of its derivatives, the second polymer having a second molecular weight, the second polymer being a second polyacrylate or a carboxymethyl cellulose, or one of their respective derivatives. The first molecular weight is less than or equal to 400,000 g/mol and greater than or equal to 150,000 g/mol. The second molecular weight is greater than or equal to 650,000 g/mol and less than or equal to 4,000,000 g/mol.

23 Claims, 4 Drawing Sheets

(51) Int. Cl.
*H01M 10/0525* (2010.01)
*C09D 11/52* (2014.01)
*C09D 11/037* (2014.01)
*C09D 11/107* (2014.01)
*C09D 11/14* (2006.01)

(52) U.S. Cl.
CPC ............ *C09D 11/52* (2013.01); *H01M 4/622* (2013.01); *H01M 4/625* (2013.01); *H01M 10/0525* (2013.01)

(56) References Cited

U.S. PATENT DOCUMENTS

| | | | | |
|---|---|---|---|---|
| 2010/0129704 | A1* | 5/2010 | Luo | H01M 4/621 429/163 |
| 2012/0231337 | A1* | 9/2012 | Miyata | H01M 4/133 429/217 |
| 2013/0266865 | A1 | 10/2013 | Kwon et al. | |
| 2015/0050555 | A1* | 2/2015 | Fukumine | H01M 4/622 429/217 |
| 2015/0287989 | A1* | 10/2015 | Hirose | H01M 4/587 429/217 |
| 2016/0099483 | A1* | 4/2016 | Lee | H01M 4/139 429/217 |
| 2016/0111718 | A1* | 4/2016 | Figgemeier | H01M 4/386 429/221 |
| 2017/0018777 | A1 | 1/2017 | Umeyama et al. | |
| 2018/0261881 | A1* | 9/2018 | Wang | H01M 4/587 |

FOREIGN PATENT DOCUMENTS

JP    2017022019 A    1/2017
KR    20140117313 A  * 10/2014

OTHER PUBLICATIONS

Office action for JP2018-547401 dated Feb. 12, 2021 and translation thereof.

* cited by examiner

ELECTRODE FOR LITHIUM-ION BATTERY COMPRISING A BINDER FORMED FROM A BLEND OF TWO POLYMERS, THE FIRST POLYMER BEING A FIRST POLYACRYLATE OR ONE OF ITS DERIVATIVES, THE SECOND POLYMER BEING A SECOND POLYACRYLATE OR A CARBOXYMETHYL CELLULOSE OR ONE OF THEIR DERIVATIVES, INK FOR PRODUCING SUCH AN ELECTRODE

Electrode for lithium-ion battery comprising a binder formed from a blend of two polymers, the first polymer being a first polyacrylate or one of its derivatives, the second polymer being a second polyacrylate or a carboxymethyl cellulose or one of their derivatives, ink for producing such an electrode.

FIELD OF THE INVENTION

The invention relates to an electrode for a lithium-ion battery comprising a binder formed by a mixture of two polymers—the first polymer is a first polyacrylate or one of its derivatives, and the second polymer is a second polyacrylate or a carboxymethyl cellulose or one of their derivatives.

The invention also relates to an ink for fabricating one such electrode.

STATE OF THE ART

As represented in FIG. 1, lithium storage batteries are conventionally formed by an electrochemical cell 1 housed in an enclosure 2. The electrochemical cell 1 is formed by a negative electrode 3 and a positive electrode 4 separated by an electrolyte 5. Both the positive and negative electrodes, respectively 3 and 4, are in contact with a current collector, 6a or 6b, which performs transport of the electrons to an external electric circuit (not shown). Depending on the type of lithium battery, the electrolyte 5 can be in solid or liquid form or in the form of a gel.

A battery is formed by several storage cells.

The electrodes 3 and 4 are generally produced by coating of an ink comprising the powdery electrochemically active material, a binder and an electron conductor, dispersed in an organic or aqueous solvent, on the current collector 6a or 6b.

The coating step is conventionally followed by drying of the ink/current collector assembly to remove the traces of solvent contained in the ink. The electrode obtained in this way adheres to the current collector.

The electron conductor is used to improve the electronic conductivity of the electrodes 3 and 4.

The binder enables the electrode to achieve cohesion of the different components of the electrodes and provides its mechanical strength on the current collector. It also gives the electrode a certain flexibility for implementation of the latter in a cell, in particular as regards the coiling step for the coiled elements.

The electrochemically active negative electrode material is formed by a metal or a semi-metal able to form an alloy with lithium. Silicon is in particular widely used.

These types of material present a very high theoretical specific capacitance (about 3580 mAh/g for silicon) compared with that of graphite (about 370 mAh/g). However, these materials present a high volume expansion when lithiation takes place. This expansion will cause degradation of the Li-ion cell made from this negative electrode material:

i) degradation of the integrity of the electrode which leads to a decrease of the capacitance of the electrode, ii) fracture of the electrode-electrolyte interface (or SEI standing for Solid Electrolyte Interface) which leads to continuous formation of degradation product, iii) addition of stresses on the whole of the battery and degradation of the other components.

To prevent degradation of the electrode and to improve the electrochemical performances of the battery, numerous studies have been carried out on the nature of the binder.

The polymer binders for electrodes commonly used at the present time are polymer binders which are soluble:

either in organic solvents such as polyvinylidene fluoride, referred to as PVDF, or in an aqueous solvent such as carboxymethyl cellulose referred to as CMC, nitrile butadiene rubber referred to as NBR, styrene butadiene rubber referred to as SBR, or polyacrylic acid (PAA) or polyacrylate depending on its degree of dissociation.

Polymer binders soluble in an aqueous solvent are preferred as they avoid the use of combustible, volatile, flammable and toxic organic solvents, sometimes classified as Carcinogenic, Mutagenic and Reprotoxic (CMR), the use of which requires particular handling conditions to be implemented.

A polymer binder is characterized by its chain length, conventionally by the molecular weight in g/mol, Mw:

$$\overline{M}_w = \frac{\sum n_x M_x^2}{\sum n_x M_x}$$

with:

$n_x$, the number of macromolecules of degree of polymerization x, $M_x$, the mass of such macromolecules.

The molecular mass, or molecular weight, of polymer is defined as being a mean weight. The molecular weights are generally distributed according to a Gaussian curve centered on the molecular weight defining same.

In order to preserve the integrity of the electrode, a binder with a relatively high Young's modulus and a sufficient elasticity, such as PAA or CMC, is preferred. CMC and PAA are both polymers with a carbon chain. The carbon chain comprises carboxylic groups, on each monomer, for PAA. For the rigid carbon chain of CMC, there is a partial substitution of certain OH groups.

The performances, particularly in terms of coulomb efficiency, are better with PAA (thesis submitted by Etienne Radvany in 2014, University of Grenoble, "Understanding the (de)lithiation and degradation mechanisms of silicon electrodes for Li-ion batteries and a study of influence factors"). The PAA binder would seem to advantageously combine good physico-chemical interactions with the active material and a high Young's modulus, as well as a sufficient elasticity, thereby enabling the integrity of the electrode to be preserved in optimal manner.

It is known to integrate PAA as binder in formulations for a negative electrode made from silicon in order to remedy the problem of expansion and contraction of the electrochemically active material.

The polyacrylate acid or the polyacrylate, depending on its degree of dissociation, used in these formulations, presents different molecular weights: 250,000 g/mol (above-mentioned thesis), 750,000 g/mol (J. Phys. Chem. C 2011, 115, 13487-13495), 1,250,000 g/mol (Energy Environ. Sci. 2012, 5, 9014-9020), between 300,000 g/mol and 3,000,000 g/mol (US 2007/0026313), between 1,000,000 g/mol and 1,250,000 g/mol (US 2013/0236778), 2,000 g/mol, 5,000 g/mol or 100,000 g/mol (Appl. Mater. Interfaces, 2010, 2, 11, 3004-3010).

Although the use of PAA enables the formation of the solid electrolyte interface to be both reduced and stabilized, it is however apparent that production of electrodes by means of the above-mentioned inks is difficult to implement. The inks of electrodes produced using these grades of PAA do not in certain cases enable large proportions of PAA, typically more than 2% by weight, to be integrated, or in other cases do not give the electrode ink suitable rheological properties for performing the coating technique conventionally used for producing the electrodes.

OBJECT OF THE INVENTION

The object of the invention is to remedy the shortcomings of the prior art and, in particular, to propose an electrode that is mechanically stable, sufficiently flexible to be assembled, and presenting improved electrochemical properties, and an ink that is easy to deposit and enables such an electrode to be obtained after drying.

This object is achieved by an electrode for a lithium storage battery, or for a lithium battery, comprising:
  an electrode active material made from silicon,
  a conductive agent,
  a binder comprising a mixture of two polymers:
    the first polymer having a first molecular weight, the first polymer being a first polyacrylate or one of its derivatives,
    the second polymer having a second molecular weight, the second polymer being a second polyacrylate or a carboxymethyl cellulose, or one of their respective derivatives.

The electrode is remarkable in that the first molecular weight is less than or equal to 400,000 g/mol and greater than or equal to 150,000 g/mol and in that the second molecular weight is greater than or equal to 650,000 g/mol and less than or equal to 4,000,000 g/mol, and, preferably, the second molecular weight is greater than or equal to 650,000 g/mol and less than or equal to 1,500,000 g/mol.

This object is also achieved by an ink for producing a lithium-ion battery electrode comprising:
  an electrode active material, made from silicon,
  a solvent,
  a conductive agent,
  a binder comprising a mixture of two polymers:
    the first polymer having a first molecular weight, the first polymer being a first polyacrylate or one of its derivatives,
    the second polymer having a second molecular weight, the second polymer being a second polyacrylate or a carboxymethyl cellulose, or one of their respective derivatives.

The ink is remarkable in that the first molecular weight is less than or equal to 400,000 g/mol and greater than or equal to 150,000 g/mol and in that the second molecular weight is greater than or equal to 650,000 g/mol and less than or equal to 4,000,000 g/mol, and, preferably, the second molecular weight is greater than or equal to 650,000 g/mol and less than or equal to 1,500,000 g/mol.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERENTIAL EMBODIMENT OF THE INVENTION

Figure 1:
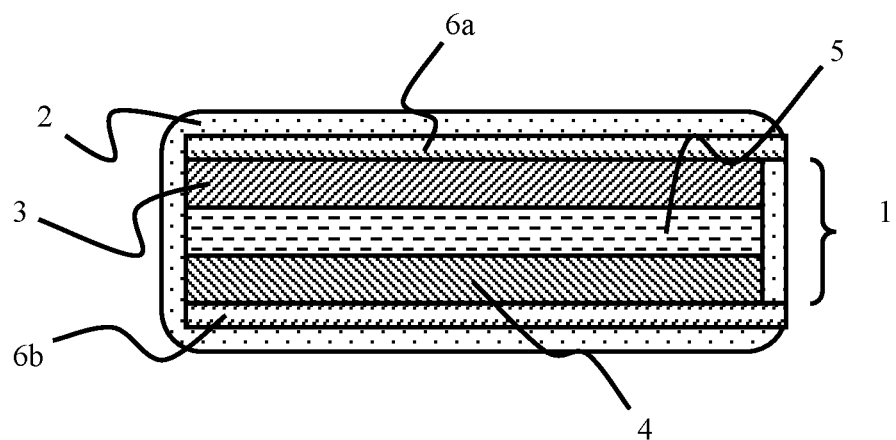
FIG. 1 represents a lithium storage battery according to the prior art, in schematic manner and in cross-section.

The ink for producing an electrode for a lithium-ion battery comprises:
  an electrode active material,
  a solvent, advantageously water,
  an electron conducting agent,
  a binder comprising a mixture of two polymers:
    the first polymer having a first molecular weight, the first polymer being a first polyacrylate or one of its derivatives,
    the second polymer having a second molecular weight, the second polymer being a second polyacrylate or a carboxymethyl cellulose, or one of their respective derivatives.
  possibly, in addition, an additive.

According to a preferential embodiment, the ink is constituted:
  by the electrode active material made from silicon,
  by the solvent,
  by the electron conducting agent,
  by the binder comprising the mixture of the two polymers.

The electrode active material is a negative electrode material used in lithium storage batteries. The negative electrode material comprises at least a metal or a semi-metal M able to form an alloy with the lithium of $Li_xM$ type with x comprised between 0 and 5. The metal or semi-metal is advantageously silicon, aluminum, tin or germanium.

Preferentially, the electrode active material is made from a silicon base.

To preserve the integrity of the material during cycling, the silicon is advantageously in the form of nanoparticles.

The silicon is in nanometric form, preferably in the form of nanoparticles to limit sputtering phenomena. Advantageously, 90% of its size distribution is smaller than 300 nm, and preferentially 50% of its size distribution is smaller than 150 nm. The size distribution is a distribution per volume.

Again with a view to preserving its integrity, the silicon can also be integrated in the form of nanoparticles in a micrometric matrix. What is meant by micrometric matrix is a matrix of micrometric size, i.e. a matrix having a size ranging from 0.1 µm to 50 µm, and advantageously a size ranging from 2 µm to 10 µm.

The micrometric matrix can be a carbon matrix or a metal matrix (Fe, Al, Co, Ni, Mn, Sn, Ge, etc).

The matrix can be predominant in weight compared with the silicon. Advantageously, this matrix represents at least 50% of the weight. Very advantageously, this matrix represents at least 80% of the weight.

Integration of nanometric silicon particles in a micrometric matrix results in the formation of a composite material enabling the impact of repeated volume expansions to be reduced.

The silicon is able to form an alloy with the lithium of $Li_xSi$ type, with x comprised between 0 and 3.75.

The active material can also be a mixture of a silicon-based compound and another compound, such as graphite for example.

The percentage by weight of electrochemically active material is greater than or equal to 85%, and preferably greater than or equal to 90% of the weight of the dried electrode.

In certain embodiments, the ink can comprise an additive, also called additional component.

This additive can be an additional polymer, such as carboxymethyl cellulose, latex to enhance the flexibility of the electrode, or a cross-linking agent such as PolyVinyl Alcohol (PVA). According to another alternative, this component can be a polyacrylate (PAA) of another molecular weight. The ink then comprises three PAAs of different molecular weights.

This other component represents 5% by weight or less of the electrode, and preferably 3% or less.

The different weight percentages expressed, unless otherwise indicated, are calculated with respect to the total sum of the weights of the following compounds: the electrode active material, the electron conductive agent, the binder, and the additive if applicable.

The solvent is not taken into account. As the solvent evaporates during the electrode fabrication process, the weight percentages relative to the ink and to the electrode are thus identical. The weight of the compounds of the ink is therefore defined here with respect to the electrode.

More precisely, what is meant by weight of the electrode or weight of the dried electrode is the weight of the different compounds once the ink has been coated and the solvent has evaporated. The term dry extract can also be used.

The conductive agent is advantageously carbon in divided form, in the form of spherical particles, or in the form of fibers for example.

The conductive agent can contain one or more electron conductive materials. The electron conductor is preferably chosen from carbon black, carbon fibers, finely-divided carbon and a mixture of the latter. What is meant by finely-divided carbon is carbon presenting a very large specific surface.

The binder represents from 2% to 15% of the weight of the dry extract, or of the weight of the dry electrode, and preferably from 4% to 10% of the weight of the dry extract.

The ink is remarkable in that the binder comprises a mixture of two polymers:
the first polymer having a first molecular weight, the first polymer being a first polyacrylate or one of its derivatives,
the second polymer having a second molecular weight, the second polymer being a second polyacrylate or a carboxymethyl cellulose, or one of their respective derivatives.

The molecular weights of the first and second polymers are different. The second molecular weight is greater than the first molecular weight. Advantageously, the first molecular weight is at most 67% by weight compared with the second molecular weight, and even at most 50% compared with the second molecular weight.

What is meant by polyacrylate derivative is a polymer or co-polymer having a base forming at least 50% of the acrylate function:

$$-[CH_2-CH]_n-$$
$$|$$
$$C=O$$
$$|$$
$$O$$
$$|$$
$$R$$

with R corresponding to a cation such as lithium, sodium, ammonium, or potassium in its dissociated form (polyacrylate).

R corresponds to H in its non-dissociated form (polyacrylic acid).

The carboxylic groups of PAA are dissociated, from a non-dissociated form, by addition of LiOH, NaOH, NH$_4$OH or KOH.

The degree of dissociation is the ratio between the number of carboxylate groups and the number of carboxylic and carboxylate groups.

The degree of dissociation of the polymers advantageously ranges from 35% to 100%.

To achieve this degree of dissociation, LiOH, NaOH, NH$_4$OH or KOH is added to a solution of PAA so as to neutralize between 35% and 100% of the carboxylic groups, depending on the required degree.

The pH of the solvent can be modified to control the degree of dissociation of the binder. The pH can be an indicator to estimate the degree of dissociation of the binder.

The macromolecules of PAA then adopt a conformation in solution that is more unfolded compared with smaller degrees of dissociation. The ink is then more viscous and also presents a more marked shear thinning behavior. This is then beneficial for the electrochemical performances.

What is meant by derivative of CMC is a polymer or co-polymer having a base formed by at least 50% of the following monomer:

with R being able to be a mixture of H, CH$_2$COOH, CH$_2$COOLi, CH$_2$COONa, or OLi, ONa, or OH.

Alginate is for example a derivative of CMC.

The degree of dissociation of the polymers ranges from 35% to 100%.

The binder is advantageously constituted by two polymers.

According to one embodiment, the first polymer is a polyacrylate and the second polymer is a carboxymethyl cellulose.

The molecular weight of the polyacrylate is advantageously greater than or equal to 150,000 g/mol and less than or equal to 400,000 g/mol.

The molecular weight of the CMC is advantageously comprised between 650,000 g/mol and 4,000,000 g/mol, and even more advantageously between 650,000 g/mol and 1,500,000 g/mol.

According to another embodiment, the first polymer and second polymer are polyacrylates or one of their derivatives.

Even more preferentially, the first polymer is a $PAA_1$ polyacrylate and the second polymer is a $PAA_2$ polyacrylate.

These inks present improved rheological properties compared with inks only containing a single polyacrylate, and they are therefore easier to deposit by coating. At the same time, they allow a greater incorporation of PAA in the ink, resulting in electrodes presenting better electrochemical properties.

Preferentially, the first molecular weight of $PAA_1$ is less than or equal to 400,000 g/mol. It is preferentially greater than or equal to 150,000 g/mol.

These PAAs can be added in large quantity in the ink as their addition does not significantly increase the viscosity.

Preferentially, the second molecular weight of $PAA_2$ is greater than or equal to 650,000 g/mol. It is preferentially less than or equal to 4,000,000 g/mol.

Even more preferentially, the second molecular weight of $PAA_2$ is greater than or equal to 650,000 g/mol and less than or equal to 1,500,000 g/mol.

For higher molecular masses, it is necessary to integrate more water in the ink to have a suitable viscosity. The stresses when drying are then high, which impairs the quality of the electrode.

Advantageously, the PAA with a mean molecular weight greater than 650,000 g·mol$^{-1}$ are formed by sufficiently long polymer chains to give the ink a shear thinning nature.

Preferentially, the first polymer and second polymer are polyacrylates, the first molecular weight being greater than or equal to 150,000 g/mol, preferably greater than or equal to 250,000 g/mol, and less than or equal to 400,000 g/mol, the second molecular weight being greater than or equal to 1,000,000 g/mol and less than or equal to 1,500,000 g/mol, and the degree of dissociation of the polymers being greater than 90%.

The weight ratio $PAA_1/PAA_2$ is greater than or equal to 1, i.e. the mixture of the PAAs is made with a maximum of 50% of the PAA of higher molecular weight.

The PAA of lower molecular weight is preponderant, which results in an ink which is easier to deposit as it is less viscous than in the case where the PAA of higher molecular weight is preponderant.

If only PAA1 is used, the ink is too viscous and if PAA2 is used on its own, the ink is not sufficiently shear thinning. A mixture of PAAs is necessary to achieve such ranges and to be able to fabricate an electrode.

The inks prepared with such mixtures of PAAs present a viscosity of 0.5 Pa·s to 5 Pa·s for a shear stress of 100 s$^{-1}$. They present a flow threshold of a few Pa. The viscosity of these inks, for a shear stress of 0.1 s$^{-1}$, is more than 10 times the viscosity of the ink for a shear stress of 100 s$^{-1}$, i.e. the ink will have a viscosity of more than 5 Pa·s at 0.1 s$^{-1}$.

Such inks present a behavior of shear thinning type with an infinite viscosity at rest, i.e. with a viscosity such that the movement of the particles of active material is blocked at rest. These inks are particularly suitable for fabrication of an electrode by coating.

For an ink comprising only a PAA with a molecular weight greater than 650,000 g/mol and a degree of dissociation comprised between 35% and 100%, the ink will present good rheological properties.

However, the PAA will not be able to be integrated in large proportions to limit the stresses when drying and therefore guarantee good mechanical properties for an electrode having a grammage of at least 2.5 mg/cm$^2$ of active material, i.e. at least 2.5 mg/cm$^2$ of active electrode material. Furthermore, it will be difficult to guarantee a high dry extract for the ink.

The performances of this electrode will be mediocre.

On the contrary, in the case of an ink comprising only PAA with a molecular weight of less than 400,000 g/mol, and a degree of dissociation comprised between 35% and 100%, the PAA will be able to be integrated in large proportions, of about 2 to 15%, but the PAA will not give the ink good rheological properties, making coating of the latter mediocre and inhomogeneous.

The shear thinning nature of the PAA can be appreciated from a solution containing only one PAA. Solutions having different PAA concentrations and presenting a degree of dissociation of 100% were prepared and their viscosities measured under the conditions described in the foregoing.

The single PAA has to have a viscosity comprised between 0.5 and 2 Pa·s at 100 s$^{-1}$ to be able to achieve a final viscosity of the ink comprised between 0.5 and 5 Pa·s. It also has to present a shear thinning behavior with a viscosity at 0.1 s$^{-1}$ ten times higher than that at 100 s$^{-1}$. The same properties are desired for the ink. The curve plots obtained are represented in FIG. 2.

Figure 2:
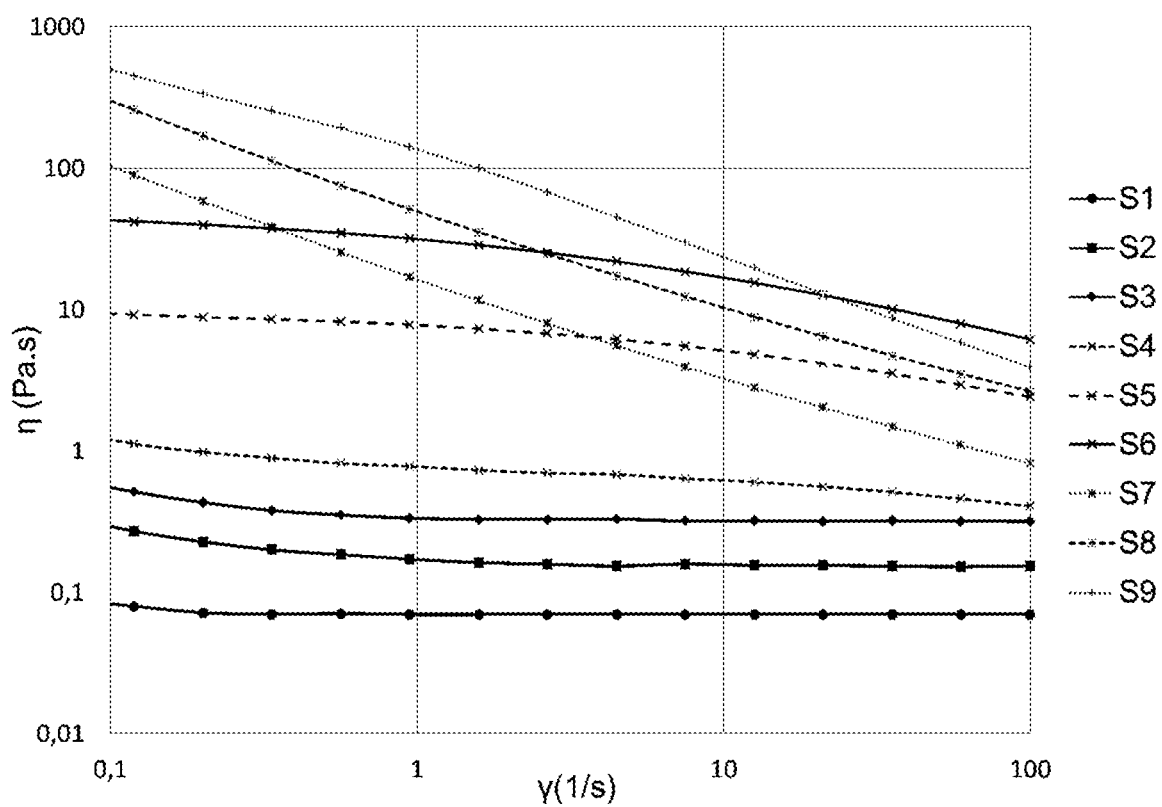
FIGS. 2, 3a, 4a are graphs representing the viscosity ($\eta$) of different inks and solutions versus the shear gradient ($\gamma$)

Different solutions were studied (FIG. 2). Their rheological properties are set out in the table below:

| | Solution | | | | Correspondence |
|---|---|---|---|---|---|
| | Mw | | Rheological properties | | (Mw) |
| Test | (kg/mol) | % m | Viscosity at 100s$^{-1}$ | Slope | $PAA_1$ or $PAA_2$ |
| S1 | 100 | 12 | − | − | $PAA_1$ |
| S2 | 250 | 12 | − | − | $PAA_1$ |
| S3 | 345 | 12 | − | − | $PAA_1$ |
| S4 | 450 | 3 | + | − | X |
| S5 | 450 | 8 | + | − | |
| S6 | 450 | 12 | − | − | |
| S7 | 1250 | 1 | + | + | $PAA_2$ |
| S8 | 1250 | 3 | + | + | $PAA_2$ |
| S9 | 3000 | 1 | − | + | $PAA_2$ |

Unless indicated otherwise, all the viscosity measurements of the inks were performed with a rheometer, in this case using Bohlin® CVO® equipment, with a head in the form of a truncated cone with a diameter of 50 mm and an angle of 4°, and a Peltier plate regulated at 20° C. A pre-shear stress is applied at 100 s$^{-1}$ for 10 s before any measurement is made. Four or five points were measured per decade with 10 s of measurement per point, ramping progressively downwards.

PAA solutions with a molecular weight of 100,000, 250,000 or 345,000 g/mol have a low viscosity at 100 s$^{-1}$, even for concentrations of 12%. They do not comprise any shear thinning property. These molecular weights correspond to the definition of $PAA_1$, i.e. a molecular weight enabling a high percentage of binder to be achieved in the electrode without adding too much viscosity to the electrode ink.

PAA solutions with a molecular weight of 450,000 g/mol have a viscosity at 100 s$^{-1}$ corresponding to what is sought for, but they do not present a sufficient shear thinning nature, even for a high concentration. This molecular weight does not correspond to either of the two definitions of PAA.

PAA solutions with a molecular weight of 1,250,000 or 3,000,000 g/mol have a suitable viscosity at 100 s$^{-1}$, provided their content is low. They also present a shear thinning nature compatible with what is sought for. These molecular weights correspond to the definition of PAA$_2$, i.e. a molecular weight giving the electrode ink good rheological properties, but not enabling a large proportion of PAA to be attained in the ink.

Two inks containing only PAA with a molecular weight of less than 400,000 g/mol were produced. They were used for fabricating electrodes with a grammage of about 5 mg of composite per cm$^2$ of electrode to be coated. The inks are the following:

Ink A: electrode composed of 90% of carbon and silicon composite having a specific capacity of 600 mAh/g (this composite material is referred to in the following as composite or SiC), 2% of carbon fibers, 3% of finely-divided carbon, and 5% of PAA with a molecular weight of 250,000 g/mol with a degree of dissociation of 33%, Ink B: electrode composed of 90% of composite, 2% of carbon fibers, 3% of finely-divided carbon, and 5% of PAA with a molecular weight of 250,000 g/mol with a degree of dissociation of 100%.

LiOH is used to dissociate the PAA in solution before the latter is incorporated in the ink.

They are compared with three electrodes that are identical but where the binder is:
- a PAA with a molecular weight of 450,000 g/mol,
- CMC with a molecular weight of 250,000 g/mol,
- a mixture of PAA and CMC with a molecular weight of 250,000 g/mol for both of them.

These 3 inks are the following:

Ink C: electrode composed of 90% of composite, 2% of carbon fibers, 3% of finely-divided carbon, and 5% of 450,000 g/mol PAA with a degree of dissociation of 33.

k CMC: electrode composed of 90% of composite, 2% of carbon fibers, 3% of finely-divided carbon, and 5% of 250,000 g/mol CMC with a degree of dissociation of 100% (the CMC used is dissociated with sodium carboxylate COONa groups), Ink CMC/PAA: electrode composed of 90% of composite, 2% of carbon fibers, 3% of finely-divided carbon, 2.5% of 250,000 g/mol CMC and 2.5% of 250,000 g/mol PAA with a degree of dissociation of 50% (the CMC and PAA are dissociated with NaOH).

The rheological properties of the five inks were measured, in viscosity, using the protocol described in the foregoing, and in oscillation mode, at 25° C. and with the same geometry, but for a stress of 1% between 0.1 and 10 Hz. Fourteen points are measured per decade, with from 6 to 45 s of measurement per point, without pre-shear stress, but with a rest time of 10 min.

Figure 3A:
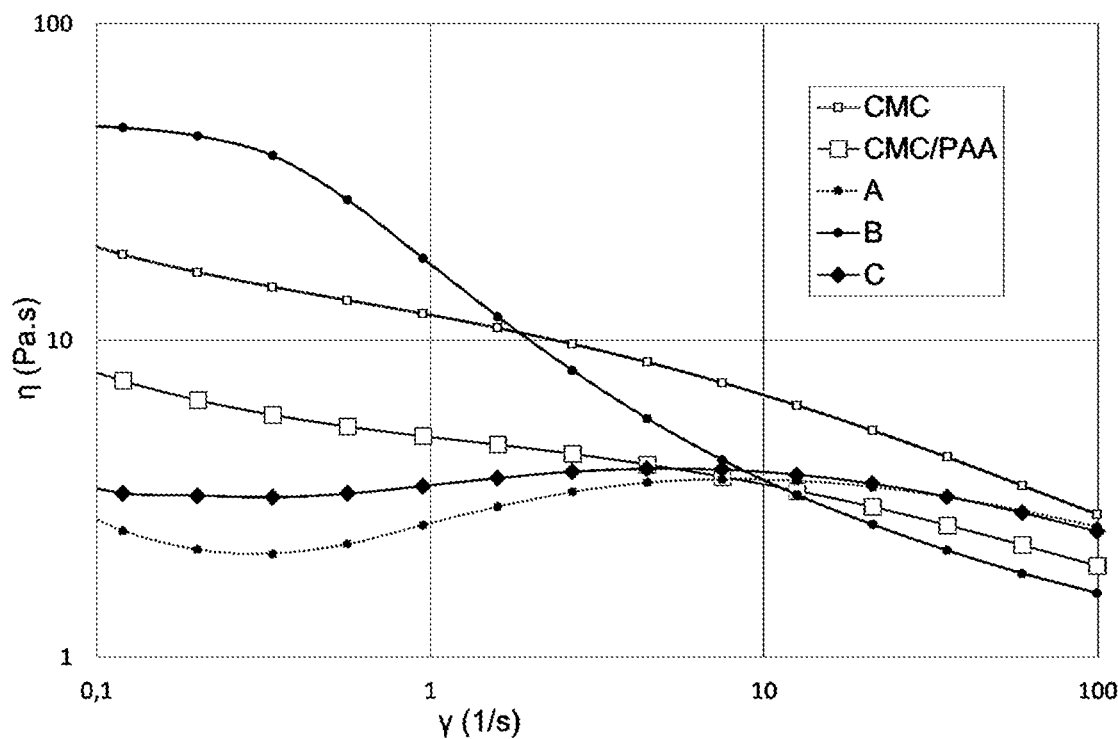
Figure 3B:
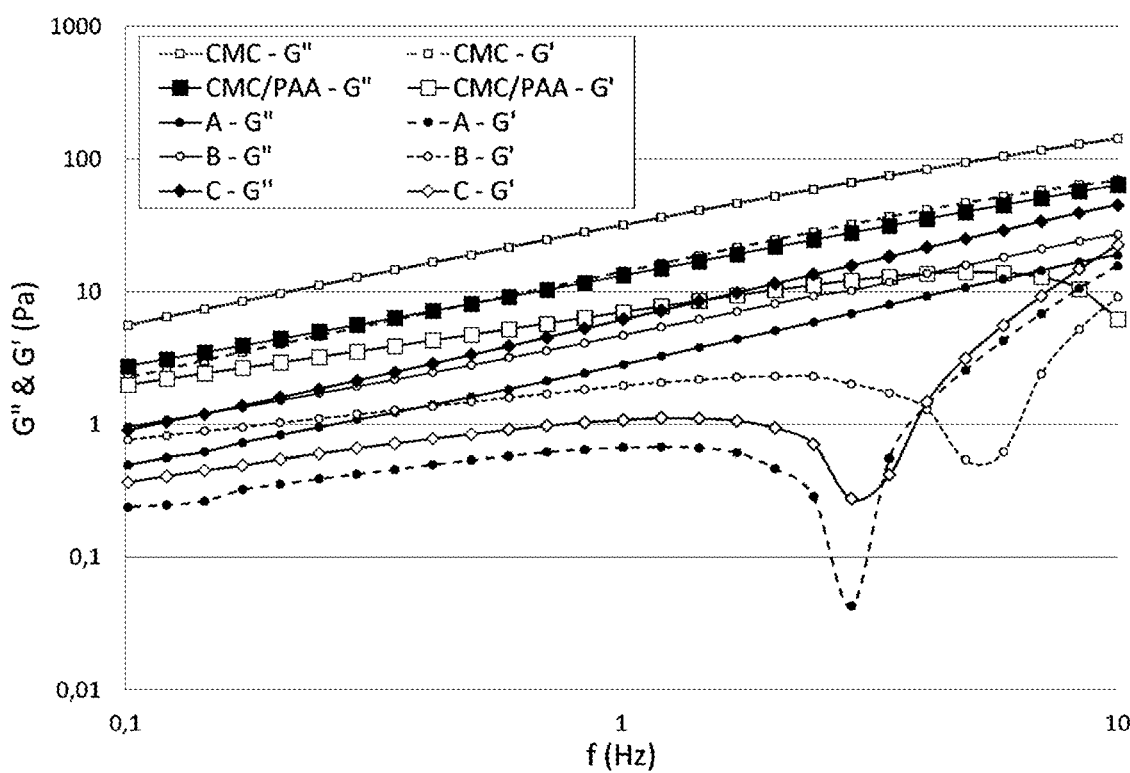
FIGS. 3b and 4b are graphs representing the viscous modulus (G'') and the elastic modulus (G') of different inks versus the frequency (f)

FIG. 3a represents the viscosity of these inks versus the shear stress. FIG. 3b represents the viscous and elastic moduli obtained in oscillation mode, without a large stress on the ink, in its linear domain, which gives access to the properties at rest of the ink.

The viscosity plots (FIG. 3a) show that inks A and C with PAAs of 250,000 g/mol and 450,000 g/mol and a degree of dissociation of 33% do not present a shear thinning nature.

This type of shear thinning behavior is achieved for mixtures with 5% of PAA at 250,000 g/mol with a degree of dissociation of 100% (ink B). However, for ink B, between 0.1 and 1 s$^{-1}$, the viscosity collapses and no longer tends towards an infinite viscosity.

The CMC and CMC/PAA inks demonstrate this shear thinning behavior with, however, a ratio of less than 10 between the viscosities at 0.1 and 100 s$^{-1}$.

Oscillation mode (FIG. 3b), with monitoring of the moduli, confirms these results. Whatever the frequency, the viscous modulus G" is always higher than the elastic modulus G' for the CMC, CMC/PAA, A, B and C inks. The ink does not block movement of the particles. The ink is not stable at rest and is therefore not suitable for the conventional method of fabricating electrodes for a Li-ion battery by coating.

Figure 4A:
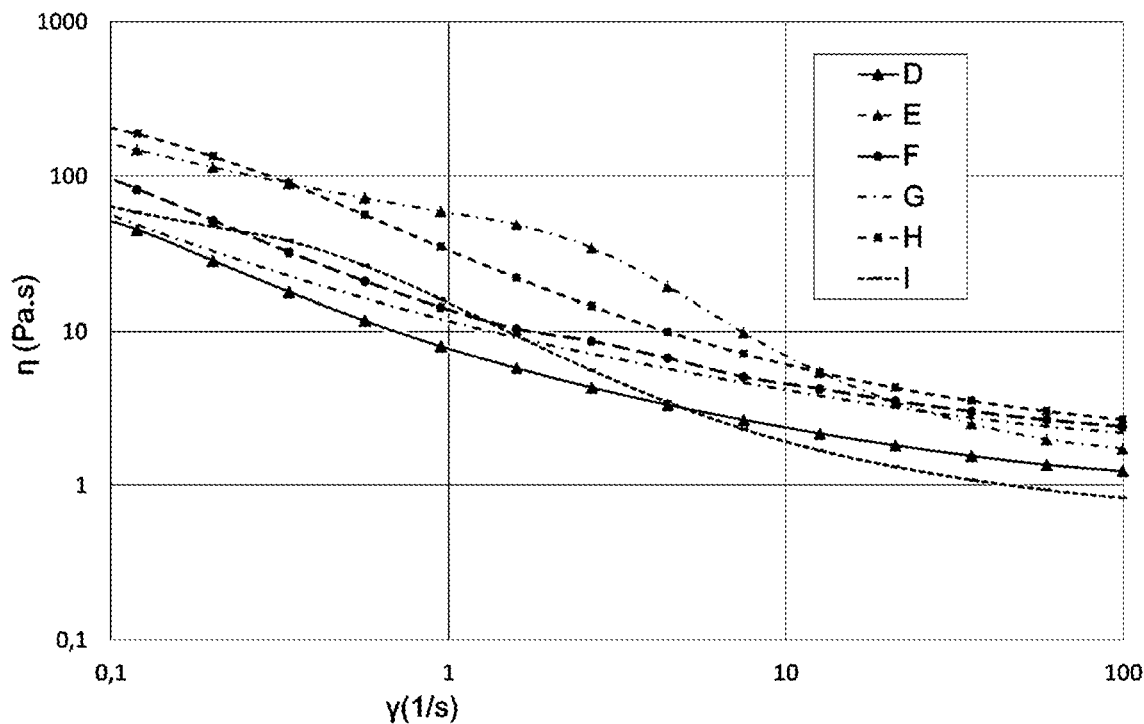
Figure 4B:
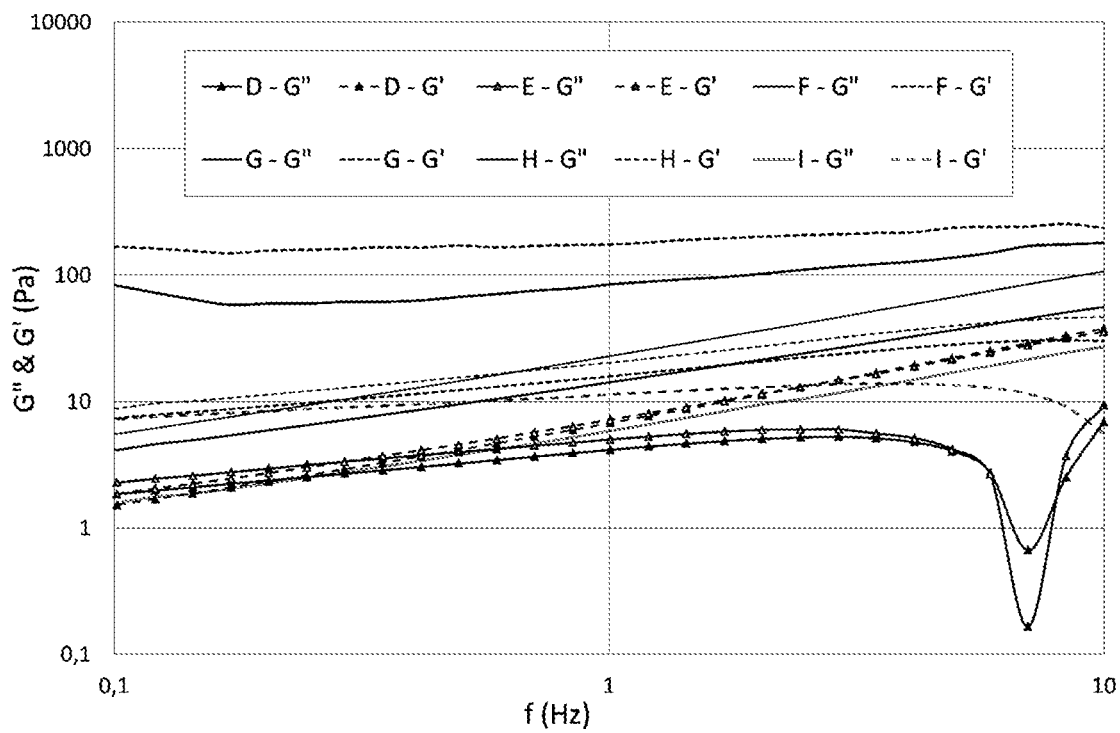

Viscosity curves (FIGS. 4a and 4b) were also plotted with the same components as before but with mixtures of PAA:

Ink D: electrode composed of 90% of composite, 2% of carbon fibers, 3% of finely-divided carbon, 1.5% of 1,250,000 g/mol PAA, and 3.5% of 250,000 g/mol PAA with a degree of dissociation of 100%.

Ink E: electrode composed of 90% of composite, 2% of carbon fibers, 1.5% of 1,250,000 g/mol PAA, 3.5% of 250,000 g/mol PAA with a degree of dissociation of 100%, and 3% of latex.

Ink F: electrode composed of 90% of composite, 2% of carbon fibers, 2.5% of 1,250,000 g/mol PAA, and 5.5% of 100,000 g/mol PAA with a degree of dissociation of 100%.

Ink G: electrode composed of 90% of composite, 2% of carbon fibers, 2.5% of 1,250,000 g/mol PAA, and 5.5% of 250,000 g/mol PAA with a degree of dissociation of 100%, Ink H: electrode composed of 90% of composite, 2% of carbon fibers, 2.5% of 1,250,000 g/mol PAA, and 5.5% of 345,000 g/mol PAA with a degree of dissociation of 100%.

Ink I: electrode composed of 90% of composite, 2% of carbon fibers, 0.5% of 3,000,000 g/mol PAA, and 7.5% of 250,000 g/mol PAA with a degree of dissociation of 100%.

The different inks are PAA-based and are set out in the table below:

| Ink | % SiC composite | % CF | % PAA$_1$ (%; CD M$_w$ in g/mol) | PAA$_2$ (%; M$_w$ in g/mol) | % Latex | DD |
|---|---|---|---|---|---|---|
| A | 90% | 2% | 3% 5% 250,000 | | | 33% |
| B | 90% | 2% | 3% 5% 250,000 | | | 100% |
| C | 90% | 2% | 3% 5% 450,000 | | | 33% |
| D | 90% | 2% | 3% 3.5% 250,000 | 1.5% 1,250,000 | | 100% |
| E | 90% | 2% | 3.5% 250,000 | 2.5% 1,250,000 | 3% | 100% |
| F | 90% | 2% | 5.5% 250,000 | 2.5% 1,250,000 | | 100% |
| G | 90% | 2% | 5.5% 250,000 | 2.5% 1,250,000 | | 100% |
| H | 90% | 2% | 5.5% 345,000 | 2.5% 1,250,000 | | 100% |
| I | 90% | 2% | 7.5% 250,000 | 0.5% 3,000,000 | | 100% |

The carbon fibers are noted CF, the finely-divided carbon is noted CD and the degree of dissociation is noted DD.

For inks D, E, F, G, H, and I containing in addition a PAA of high molecular weight, with a degree of dissociation of 100%, the ink has a very marked shear thinning nature—a factor of at least 50 is observable between the viscosity at 100 s$^{-1}$ and that at 0.1 s$^{-1}$.

Another component, such as latex, can be added without impairing the stability of the ink (ink E). As far as the moduli are concerned, an elastic modulus that is always higher than the viscous modulus is always observed for low frequencies, characteristic of an ink stable at rest.

The rheological assessments of the different inks are set out in the table below:

| Ink | PAA$_1$ Mw (kg/mol) | PAA$_1$ %m | PAA$_2$ or CMC Mw (kg/mol) | PAA$_2$ or CMC %m | DD | Viscosity at 100 s$^{-1}$ | Slope | G' vs G'' | Result Electrode |
|---|---|---|---|---|---|---|---|---|---|
| CMC |  |  | 250 | 5 | 100% | + | 0 | − | 0 |
| CMC/PAA | 250 | 2.5 | 250 | 2.5 | 50% | + | 0 | − | 0 |
| A | 250 | 5 |  |  | 33% | + | − | − | − |
| B | 250 | 5 |  |  | 100% | + | + | − | − |
| C | 450 | 5 |  |  | 33% | + | − | − | − |
| D | 250 | 3.5 | 1250 | 1.5 | 100% | + | + | + | + |
| E | 250 | 3.5 | 1250 | 1.5 | 100% | + | + | + | + |
| F | 100 | 5.5 | 1250 | 2.5 | 100% | + | + | + | + |
| G | 250 | 5.5 | 1250 | 2.5 | 100% | + | + | + | + |
| H | 345 | 5.5 | 1250 | 2.5 | 100% | + | + | + | + |
| I | 250 | 7.5 | 3000 | 0.5 | 100% | + | + | + | + |

The mixtures of PAA only referring to inks C and G were characterized by gel permeation chromatography (GPC). The mixtures were diluted at values of 0.1 mg/L to be able to perform the measurement. The results obtained clearly reveal a mixture of molecular weights, with a distribution of bi-modal type.

To integrate a large proportion of PAA and to have both a viscosity at 100 s$^{-1}$ comprised between 0.5 and 2 Pa·s and a shear thinning nature, it is indeed necessary to have a mixture of PAA with two distinct molecular weights.

The formulation with a mixture of two polymers, the first polymer being a polyacrylate or one of its derivatives, and the second polymer being a polyacrylate, a carboxymethyl cellulose or one of their respective derivatives, enables negative electrodes to be fabricated presenting good electrochemical and mechanical properties, in particular in terms of first cycle irreversibility and loss per cycle during cycling.

The method for fabricating an electrode for a lithium storage battery, or a lithium battery, comprises the following successive steps:
deposition and drying of an ink, as described in the foregoing, on a current collector to obtain an electrode,
drying of the traces of solvent of the electrode,
calendaring of the electrode.

The electrode drying method is preferably performed at a temperature of less than 150° C., and even more preferentially at a temperature of less than 130° C. The PAAs may cross-link with one another and the electrode may comprise PAA$_1$-PAA$_1$ PAA$_2$-PAA$_2$ or PAA$_1$-PAA$_2$ "macropolymers", if the electrode is dried at a temperature above the conventionally used temperature, for example temperatures of more than 150° C. Nevertheless, this cross-linking reduces the elasticity of the binder and is not desirable for the performances of the electrode.

Temperatures below the temperatures indicated above should advantageously be used so as to prevent cross-linking of the polyacrylates.

The binder is thus formed by a mixture formed by the first polyacrylate PAA$_1$ and second polyacrylate PAA$_2$, and no cross-linking takes place.

The ink is initially obtained by mixing the different compounds in distilled water:
the electrochemically active material, solvent, binder, electron conductive agent, and additive if appropriate.

Furthermore, a base to dissociate the polymer can also be added to the ink. The ink can also comprise another component such as a polymer.

The ink is then deposited in the form of a layer of variable thickness on a foil, generally made from metal, forming a current collector, to form an ink/collector assembly.

The current collector is preferably made from copper, and is for example formed by a copper foil.

Deposition of the ink is preferably performed by means of a conventional coating method, for example with a controlled thickness transfer system, or by means of a coating system by a nozzle in the form of a slit.

The electrode presents a grammage of at least 2.5 mg/cm$^2$ of deposited active material.

Advantageously, the grammage is at least 2.5 mg/cm$^2$ and is limited to 20 mg/cm$^2$. Preferentially, the electrode has a grammage ranging from 2.5 mg/cm$^2$ to 10 mg/cm$^2$ of deposited active material and a density of at least 1.4. The electrode obtained is therefore compact and dense.

Even more advantageously, the grammage is comprised between 4 and 10 mg/cm$^2$.

The quality of the ink obtained means that coating can be performed with a high coating rate, of several m·min$^{-1}$, suitable for an industrial application.

The ink/collector assembly is then dried by means of any known method to evaporate the solvent and obtain an electrode supported on the current collector.

The electrodes obtained from such an ink, with a grammage of about 5 mg/cm$^2$ of active material, present good mechanical properties, in particular in terms of flexibility and adhesion, even without latex.

These electrodes can easily be integrated in Li-ion cells, generally by means of coiling or stacking methods.

The electrode is then dried by means of any known method to evaporate the traces of solvent.

The electrode formed in this way can then be compressed or calendared to improve the energy density of the electrode and increase the electronic conductivity of the electrode, typically to achieve a density of at least 1.4. Compression or calendaring has the effect of moving the particles of electrochemically active material closer to one another, densifying the layer thereby improving the electrical percolation between the particles of the electrochemically active material of the electrode.

The electrode for a lithium storage battery obtained by the method comprises:
an electrode active material, preferentially made from silicon,
a conductive agent,
a binder.

The silicon is in the form of nanoparticles. The silicon can be inserted in a micrometric matrix. The silicon is able to form an alloy with the lithium of LixSi type, with x comprised between 0 and 3.75.

Advantageously, 90% of the silicon in the form of nanoparticles presents a size distribution of less than 300 nm, and preferably 50% of the silicon in the form of nanoparticles presents a size distribution of less than 150 nm.

The binder comprises a mixture of two polymers:
the first polymer having a first molecular weight, the first polymer being a first polyacrylate or one of its derivatives,
the second polymer having a second molecular weight, the second polymer being a second polyacrylate or a carboxymethyl cellulose, or one of their respective derivatives.

The binder provides the strength, cohesion and flexibility of the electrode and enhances the interaction between the electrode and the electrolyte of the lithium storage battery.

The binder preferentially represents from 2% to 15% of the weight of the electrode, and preferably from 4% to 10% of the weight of the electrode. With such ranges of values, the electrochemical properties are improved.

According to a first embodiment, the first polymer is a polyacrylate and the second polymer is a carboxymethyl cellulose.

According to a second embodiment, the first polymer and second polymer are polyacrylates or one of their derivatives.

Preferentially, the first polymer is a $PAA_1$ polyacrylate and the second polymer is a $PAA_2$ polyacrylate.

The first molecular weight is less than or equal to 400,000 g/mol and greater than or equal to 150,000 g/mol.

The second molecular weight is greater than or equal to 650,000 g/mol and less than or equal to 4,000,000 g/mol, and preferably the second molecular weight is greater than or equal to 650,000 g/mol and less than or equal to 1,500,000 g/mol.

The degree of dissociation of the polymers ranges from 35% to 100%.

Even more preferentially, the first polymer is a $PAA_1$ polyacrylate and the second polymer is a $PAA_2$ polyacrylate, the first molecular weight being greater than or equal to 150,000 g/mol, preferably greater than or equal to 250,000 g/mol and less than or equal to 400,000 g/mol, the second molecular weight being greater than or equal to 1,000,000 g/mol and less than or equal to 1,500,000 g/mol, and the degree of dissociation of the polymers is greater than 90%.

The first molecular weight is at most 67% by weight compared with the second molecular weight.

Preferentially, the binder is formed by the two polymers.

According to one embodiment, the electrode for a lithium storage battery, or a lithium battery, is formed:
by the active electrode material, made from silicon,
by the conductive agent,
by the binder comprising the mixture of the two polymers.

The electrode advantageously does not contain any latex.

The weight percentage of the second polyacrylate is advantageously less than or equal to 2% with respect to the total weight of the electrode to give the ink a maximum viscosity of 5 Pa·s to 100 $s^{-1}$. It is preferably greater than or equal to 0.1% with respect to the total weight of the electrode.

An absence of cracking and/or of debonding of the electrode for the selected PAA mixtures was also observed.

The electrode presents a good homogeneity and a good flexibility as well as a good adherence to the current collector. Lithium storage batteries comprising at least one such electrode consequently have improved electrochemical performances.

The mechanical strength of the electrode enables the electrode to be easily printed whatever the form of the pattern, even for high electrode grammages.

Non-polymerization of the PAAs in the drying stage was verified. An electrode was subjected to an extraction treatment of the binder. This extracted binder was characterized by the chromatographic method described in the foregoing enabling the bi-modal distribution of the molecular weight to be recovered.

Cycling tests at 20° C. were also performed on the electrodes produced from the inks described in the foregoing, in a button cell facing metal lithium with an electrolyte made from carbonates containing fluorinated ethylene carbonate. The electrode is cycled with a C/10 charge rate, i.e. charging in 10 h taking account of the proportion and the specific capacitance of the composite.

The cyclings are performed with a VMP3 from the Biologic Company to obtain a precision of at least 0.05% on the coulomb efficiency, i.e. the ratio between the delithiation or reduction current and the lithiation or oxidation current for one and the same cycle (the cycle starting by a lithiation or a reduction). First cycle irreversibility is thus equal to 1 less the coulomb efficiency on the first cycle and the loss per cycle is equal to 1 less the coulomb efficiency for a given cycle.

Figure 5:
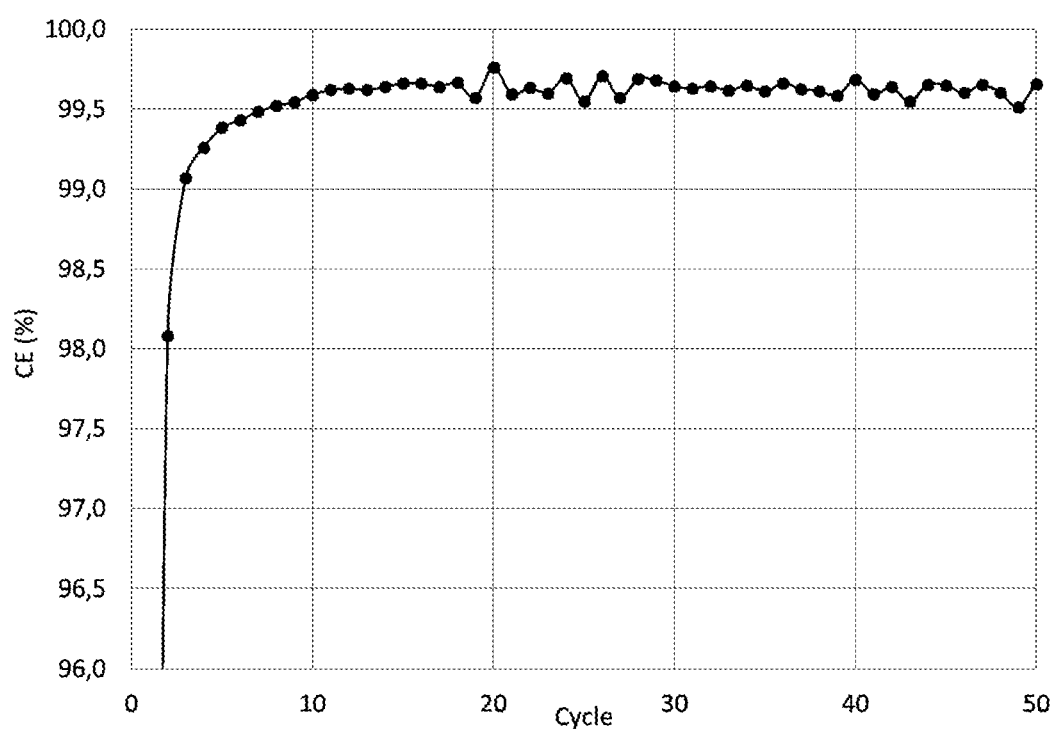
FIG. 5 represents the coulomb efficiency (CE) versus the number of cycles for an electrode comprising a binder formed by a first polyacrylate having a molecular weight of 250,000 g/mol and a second polyacrylate having a molecular weight of 1,250,000 g/mol with a degree of dissociation of 100% (electrode G) in a button cell.

The results showed that in the first cycle, first cycle irreversibility is high, associated with the formation of the electrode/electrolyte interface. The loss per cycle then attenuates and is completely stabilized after 10 cycles for several tens of cycles (FIG. 5).

The different electrodes tested were then compared as regards first cycle irreversibility and stabilized loss after 10 cycles, typically between 10 and 20 cycles.

The results are set out in the following tables:

| Electrode | CMC | CMC/PAA | A | B | C |
|---|---|---|---|---|---|
| 1st cycle irreversibility (%) | 12% | 12.1% | 14.8% | 13.2% | 14.7% |
| Loss per cycle (%) | 99.5% | 99.5% | 99.2% | 99.2% | 99.2% |

| Electrode | D | E | F | G | H | I |
|---|---|---|---|---|---|---|
| 1st cycle irreversibility (%) | 12.6% | 12.4% | 12.7% | 11.8% | 11.3% | 12.3% |
| Loss per cycle (%) | 99.5% | 99.5% | 99.3% | 99.6% | 99.7% | 99.5% |

The poorest performances (electrochemical and as regards the quality of the electrode) are obtained by the electrodes formed by a single binder of a single molecular weight.

An improvement is obtained when a binder comprising two polymers is used. And the best results are obtained with formulations D to I which are the PAA mixtures of two different molecular weights (with a first molecular weight of at most 67% compared with the second molecular weight) and a degree of dissociation of 100%.

Results were also obtained in the reference format 18650. The positive electrode is made from $LiCoO_2$, with a grammage of 18.3 $mg/cm^2$, i.e. 2.5 $mAh/cm^2$, and a porosity of 25%. The two negative electrodes compared correspond to the CMC/PAA formulations and the mixture of two PAAs (electrode G), with a grammage of 5.6 $mg/cm^2$, i.e. 3.0 $mAh/cm^2$ and a porosity of 35%. The electrolyte is made from carbonates containing fluorinated ethylene carbonate. The following results were obtained for cyclings at 20° C., with a C/2 charge rate, between 4.2 and 2.7V:

| Electrode | CMC/PAA | G |
|---|---|---|
| 1st cycle irreversibility (%) | 16.5% | 15% |
| Capacitance retention after 10 cycles (%) | 94.7% | 96.5% |

-continued

| Electrode | CMC/PAA | G |
|---|---|---|
| Capacitance retention after 100 cycles (%) | 72.3% | 84.3% |
| Capacitance retention after 200 cycles (%) | 62.3% | 74.7% |

The capacitance retention after a number of cycles n is the ratio between the discharged capacitance at cycle n and the discharged capacitance at cycle 2.

It was observed that PAA shows improved performances compared with a conventional formulation using CMC.

A reduction of 1.5% of first cycle irreversibility was observed between the 18650 element made from electrode G in comparison with that of the CMC/PAA electrode.

The capacitance retention is also greatly improved with the 18650 element made from electrode G in comparison with that of the CMC/PAA electrode.

The lifetime of the Li-ion storage battery with the optimized formulation on the negative electrode is increased by more than 50%, based on the number of cycles before a capacitance retention of 80% is achieved compared with the capacitance at cycle 2.

The invention claimed is:

1. Electrode for a lithium storage battery, or a lithium battery, comprising:
an electrode active material made from silicon,
a conductive agent,
a binder comprising a mixture of two polymers:
a first polymer having a first molecular weight, the first polymer being a first polyacrylate or one of its derivatives,
a second polymer having a second molecular weight, the second polymer being a second polyacrylate or one of its derivatives,
wherein the first molecular weight is greater than or equal to 150,000 g/mol and less than or equal to 400,000 g/mol and
wherein the second molecular weight is greater than or equal to 650,000 g/mol and less than 4,000,000 g/mol.

2. Electrode according to claim 1, wherein a degree of dissociation of the first polymer and the second polymer ranges from 35% to 100%.

3. Electrode according to claim 1, wherein the first polymer and the second polymer are polyacrylates.

4. Electrode according to claim 3, wherein:
the first molecular weight is greater than or equal to 150,000 g/mol, and less than or equal to 400,000 g/mol,
the second molecular weight is greater than or equal to 1,000,000 g/mol and less than or equal to 1,500,000 g/mol,
a degree of dissociation of the first and second polymers is greater than 90%.

5. Electrode according to claim 1, wherein the first molecular weight is at most 67% by weight compared with the second molecular weight.

6. Electrode according to claim 1, wherein a weight of the binder represents from 2% to 15% of a weight of the electrode.

7. Electrode according to claim 1, wherein the silicon is in the form of nanoparticles, and the silicon forms an alloy with the lithium, the alloy is of $Li_xSi$ type, with x comprised between 0 and 3.75.

8. Electrode according to claim 1, wherein the silicon is inserted in a micrometric matrix, and the silicon forms an alloy with the lithium, the alloy being of $Li_xSi$ type, with x comprised between 0 and 3.75.

9. Electrode according to claim 7, wherein 90% of the silicon is in the form of nanoparticles, the nanoparticles presenting a size distribution of less than 300 nm.

10. Electrode according to claim 1, wherein the electrode has a grammage ranging from 2.5 mg/cm² to 10 mg/cm² of deposited active material and a density of at least 1.4.

11. Electrode according to claim 1, wherein the electrode does not contain any latex.

12. Electrode according to claim 1, further comprising an additive, the additive representing 5% by weight or less of the electrode.

13. Ink for producing an electrode for a lithium-ion battery, comprising:
an electrode active material made from silicon,
a solvent,
a conductive agent,
a binder comprising a mixture of first and second polymers,
the first polymer having a first molecular weight, the first polymer being a first polyacrylate or one of its derivatives,
the second polymer having a second molecular weight, the second polymer being a second polyacrylate or a carboxymethyl cellulose, or one of their respective derivatives,
wherein the first molecular weight is greater than or equal to 150,000 g/mol and less than or equal to 400,000 g/mol and
wherein the second molecular weight is greater than or equal to 650,000 g/mol and less than 4,000,000 g/mol.

14. Ink according to claim 13, wherein the first and second polymers has a degree of dissociation ranging from 35% to 100%.

15. Ink according to claim 13, wherein the first polymer and the second polymer are polyacrylates.

16. Ink according to claim 13, wherein the first polymer is a polyacrylate and the second polymer is a carboxymethyl cellulose.

17. Ink according to claim 13, wherein the binder represents from 2% to 15% of the weight of the ink in a dried form.

18. Ink according to claim 13, wherein the silicon is in the form of nanoparticles, the silicon being comprised or not in a micrometric matrix, and the silicon forms an alloy with the lithium of $Li_xSi$ type, with x comprised between 0 and 3.75.

19. Ink according to claim 18, wherein 90% of the silicon in the form of nanoparticles presents a size distribution of less than 300 nm.

20. Electrode according to claim 1, wherein the first molecular weight is at most 50% by weight compared with the second molecular weight.

21. Electrode according to claim 1, wherein the first polymer and the second polymer are polyacrylates and wherein the weight ratio of the first polymer to the second polymer is greater than or equal to 1.

22. Electrode according to claim 3, wherein:
the first molecular weight is greater than or equal to 250,000 g/mol and less than or equal to 400,000 g/mol,
the second molecular weight is greater than or equal to 1,000,000 g/mol and less than or equal to 1,500,000 g/mol,
a degree of dissociation of the first and second polymers is greater than 90%.

23. Electrode for a lithium storage battery, or a lithium battery, comprising:

an electrode active material made from silicon,
a conductive agent,
a binder comprising a mixture of two polymers:
   a first polymer having a first molecular weight, the first polymer being a first polyacrylate or one of its derivatives,
   a second polymer having a second molecular weight, the second polymer being a carboxymethyl cellulose,
wherein the first molecular weight is greater than or equal to 150,000 g/mol and less than or equal to 400,000 g/mol and
wherein the second molecular weight is greater than or equal to 650,000 g/mol and less than or equal to 4,000,000 g/mol.

* * * * *